United States Patent [19]

Nishizawa et al.

[11] Patent Number: 6,031,689
[45] Date of Patent: Feb. 29, 2000

[54] MAGNETIC DISC READING HEAD HAVING REDUCED FRICTION WITH A FLOPPY DISK

[75] Inventors: Hiroshi Nishizawa; Katsuaki Kanaya, both of Hanamaki, Japan

[73] Assignee: Matsushita Electric Industrial Co., Ltd., Osaka, Japan

[21] Appl. No.: 09/059,707

[22] Filed: Apr. 14, 1998

[30] Foreign Application Priority Data

Apr. 14, 1997 [JP] Japan ................................ 9-110053

[51] Int. Cl.[7] .......................... G11B 5/48; G11B 5/187; G11B 5/42
[52] U.S. Cl. .................. 360/104; 360/122; 29/603.12
[58] Field of Search .................. 360/104, 122; 29/603.12, 603.15–603.18

[56] References Cited

U.S. PATENT DOCUMENTS 5,052,099  10/1991  Taguchi ..................... 29/603

FOREIGN PATENT DOCUMENTS 8007465  1/1996  Japan .
8115514  5/1996  Japan .
9063030  3/1997  Japan .

*Primary Examiner*—A. J. Heinz
*Attorney, Agent, or Firm*—Pollock, Vande Sande & Amernick

[57] ABSTRACT

A floppy disk system is provided which includes a pair of magnetic heads each consisting of a slider with which a magnetic disk moves in contact and a magnetic core which is formed in the slider and has formed therein a magnetic gap. The magnetic heads holds the magnetic disk therebetween to record or reproduce information signals on or from the magnetic disk. The disk contact surface of each of the sliders is polished to have a surface roughness of 2 to 8 nmRa for avoiding the stick-slip between the magnetic heads and the magnetic disk, thereby decreasing the start torque of a spindle motor required for rotating the disk.

4 Claims, 5 Drawing Sheets

MAGNETIC DISC READING HEAD HAVING REDUCED FRICTION WITH A FLOPPY DISK

BACKGROUND OF THE INVENTION

1. Technical Field of the Invention

The present invention relates generally to an improved structure of magnetic heads of a floppy disk system which may be employed as an external storage for personal computers.

2. Background of Related Art

Japanese Patent First Publication No. 8-7465 teaches a conventional floppy disc system designed to hold a magnetic recording medium or disk using a pair of magnetic heads and rotate it through a spindle motor for recording or reproducing information.

In recent years, with the recording density getting greater, the surface of a disk is becoming more fine, nearing the mirror finished surface. The surface roughness of the disk is of the order of 5 to 15 nmRa. Such being the case, a spacing loss caused by the clearance between each of the magnetic heads and the disk and wear resistance of the disk are improved. The so-called pass wear of the disk is also improved greatly.

With the spread of personal computers, the size thereof is reduced, and floppy disc systems of the type wherein they are used in a standby mode in which the power source is turned off, except practical use, have become prevalent.

In such a standby mode, the coefficient of static friction between the magnetic heads and the disk is increased because of the fine surface of the disk. Increased ambient temperature and humidity will cause the disk to be stuck to the magnetic head, thereby requiring an increase in starting torque of the spindle motor. The sticking of the disk to the magnetic head may induce the stick-slip between the magnetic heads and the disk, thereby causing the magnetic heads and an arm supporting the magnetic head to vibrate undesirably, resulting in an error in reading or writing the information from or on the disk. This increases the need for a higher power spindle motor.

SUMMARY OF THE INVENTION

It is therefore a principal object of the present invention to avoid the disadvantages of the prior art.

It is another object of the present invention to provide a floppy disc system having an improved head structure which reduces the wear of a magnetic disk to allow the magnetic disk to be rotated with a decreased motor torque.

According to one aspect of the present invention, there is provided a floppy disk system which comprises a pair of magnetic heads each consisting of a slider with which a magnetic disk moves in contact and a magnetic core made of a soft magnetic material. The magnetic core is formed in the slider and has formed therein a magnetic gap. The magnetic heads holds the magnetic disk therebetween to record or reproduce information signals on or from the magnetic disk. Each of the sliders of the magnetic heads has a surface roughness of 3 to 8 nmRa.

In the preferred mode of the invention, each of the sliders of the magnetic heads has a Vickers hardness of 600 to 800 Hv.

Each of the sliders of the magnetic heads is made of one of a calcium titanate-based ceramic material and a barium titanate-based ceramic material.

According to another aspect of the invention, there is provided a manufacturing process for a magnetic head of a floppy disk system which comprises the steps of preparing a magnetic head including a slider with which a magnetic disk moves in contact and a magnetic core made of a soft magnetic material and lapping a surface of the slider with one of a chromic acid abrasive powder and a diamond powder having a grain size of approximately 2 to 8 $\mu$m to have a surface roughness of 3 to 8 nmRa.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment but are for explanation and understanding only.

In the drawings.

DESCRIPTION OF THE PREFERRED EMBODIMENT

Figure 1:
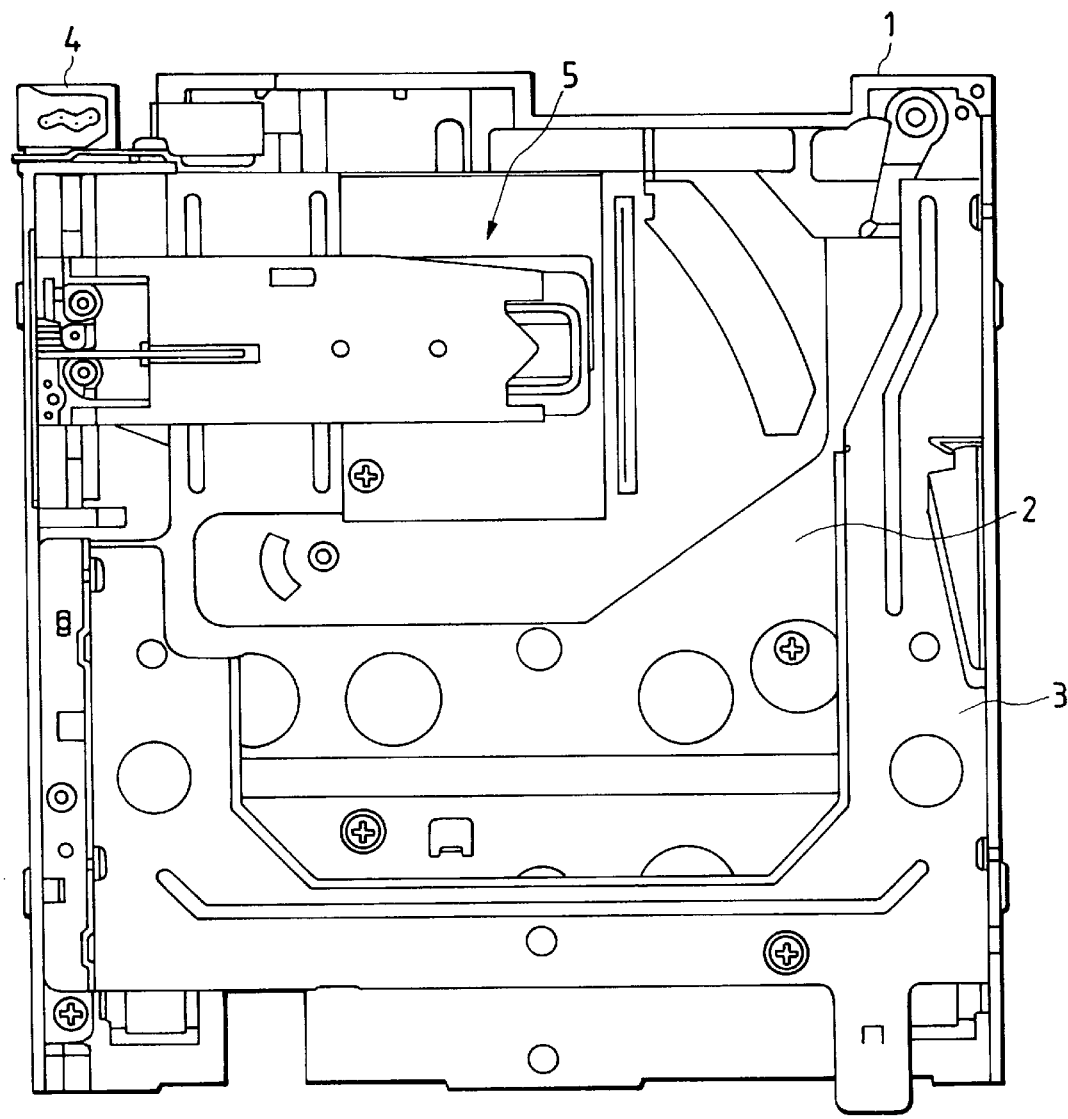
FIG. 1 is an exploded view which shows a floppy disk system according to the present invention.

Referring now to the drawings, particularly to FIG. 1, there is shown a floppy disk system according to the present invention.

The floppy disk system includes a base plate 1, a disk holder 2, an eject lever 3, a stepper motor 4, and a head carriage 5.

Figure 2:
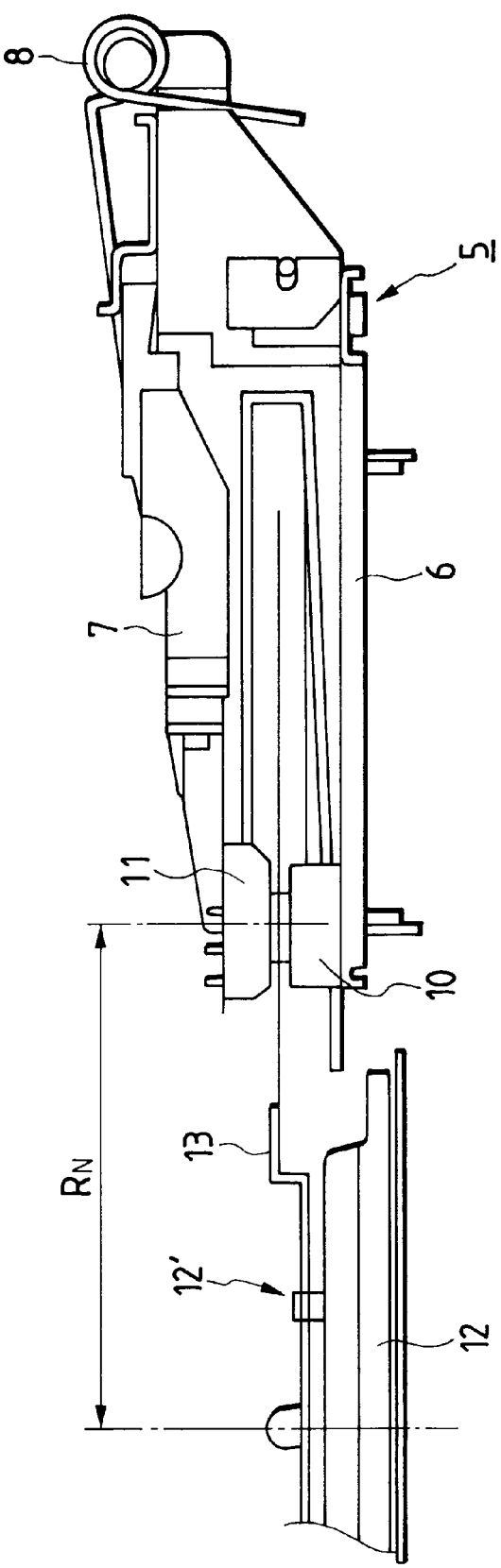
FIG. 2 is a partial side view which shows a head carriage structure of the floppy disk system in FIG. 1.

The base plate 1 is made of aluminum in die casing or a metal plate in press working. The disk holder 2 holds a magnetic recording medium or disk. The eject lever 3 loads and unloads the disk into and from the floppy disk system together with the disk holder 2. The stepper motor 4 has disposed on its output shaft a lead screw (not shown). The head carriage 5, as shown in FIG. 2, has disposed thereon a pair of magnetic heads 10 and 11 which are opposed to each other and which are moved across a radius of the disk 3 to one of tracks by the stepper motor 4 for writing or reading information. The head carriage 5 consists of a carriage 6 on which the magnetic head 10 is mounted and an arm 7 on which the magnetic head 11 is mounted. The arm 7 extends over the carriage 6 and is urged by a spring 8 downward, as viewed in the drawing, to bring the magnetic head 11 into constant engagement with the magnetic head 10 through the disk 13.

The floppy disk system also includes a spindle motor 12 which turns the disk 13 and which includes a chuck 12' for holding the disk 13.

Figure 3:
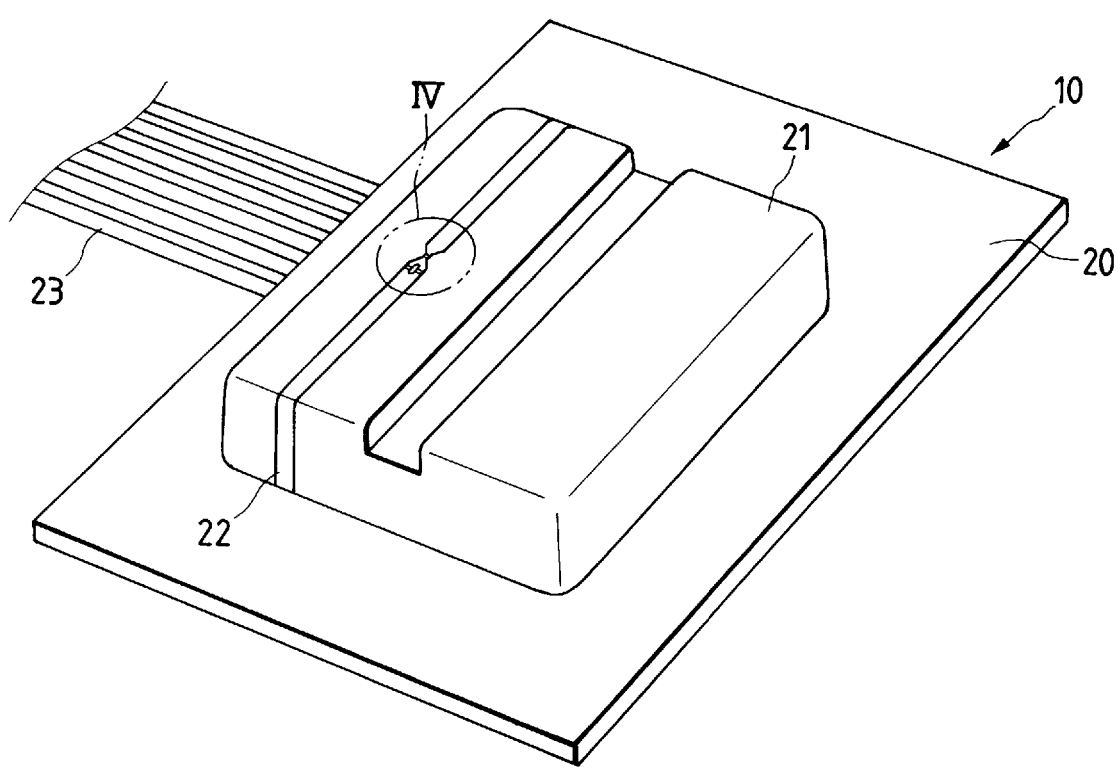
FIG. 3 is a perspective view which shows a structure of a magnetic head.

FIG. 3 shows the magnetic head 10. The magnetic head 11 is different from the magnetic head 10 only in that it is, as known in the art, supported by a gimbal spring, and explanation thereof in detail will be omitted there.

The magnetic head 10 includes a slider 21 with which the disk 13 moves in contact and a magnetic core 22 formed in the slider 22. The magnetic core 22 is made of a soft magnetic material and extends in a lengthwise direction of tracks of the disk 13. The slider 21 is installed on the carriage 6 through a mounting plate 20. The slider 21 is made of, for example, a calcium titanate-based ceramic material. The magnetic core 22 is made of a Ni-Zn-based ferrite material.

The magnetic core 22 and the slider 21 are substantially close in the hardness and coefficient of thermal expansion to each other. The magnetic core 22 may alternatively be made of a Ni-Zn-based ferrite material. In this case, the slider 21 is made of a barium titanate-based ceramic material.

Figure 4:
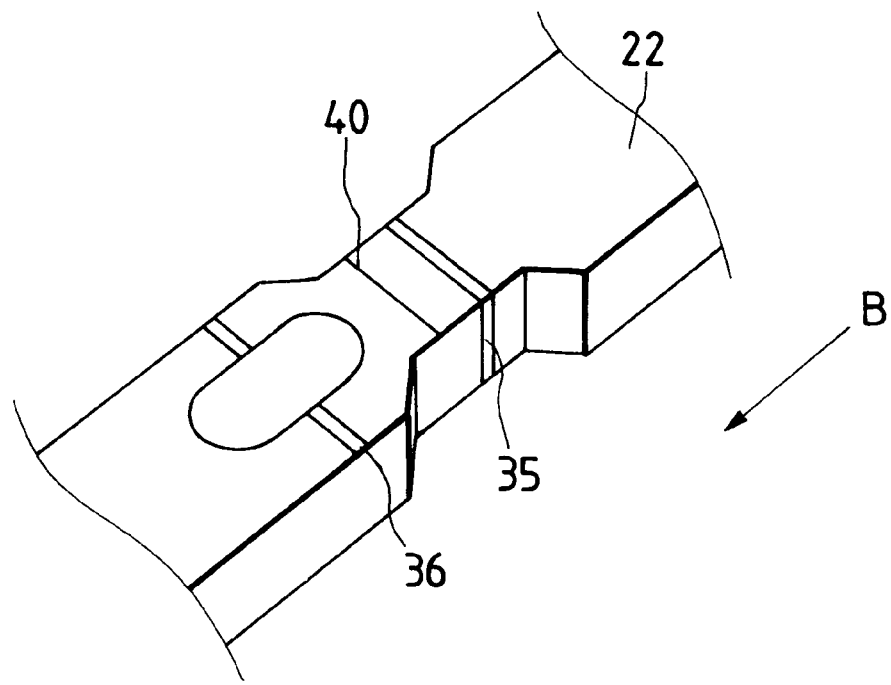
FIG. 4 is an enlarged perspective view which shows a major portion of the magnetic head as enclosed by a circle IIII in FIG. 3.

The magnetic core 22, as shown in FIG. 4, has formed therein an R/W gap 35 for reading and writing information from and on the disk 13 and an erase gap 36 for trim-erasing both sides of the record track. The arrow B indicates the direction in which the disk 13 rotates.

Figure 5:
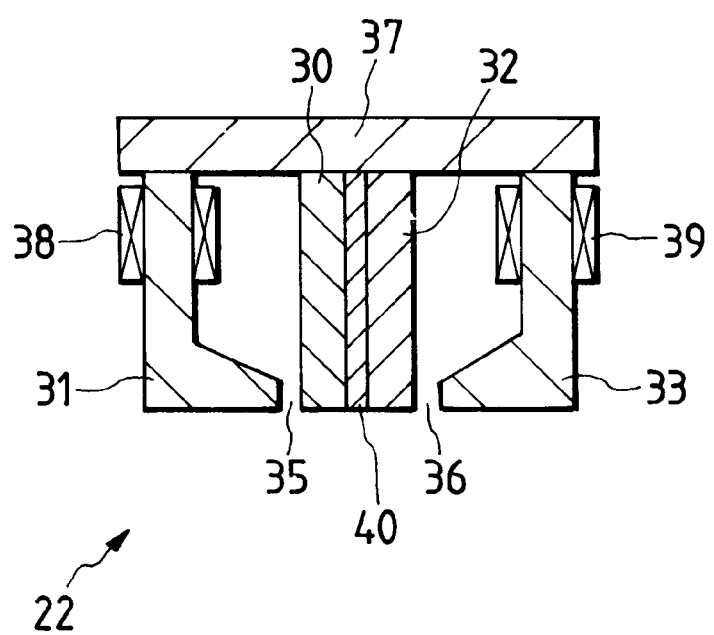
FIG. 5 is a cross sectional view of FIG. 4.

The R/W gap 35 is, as shown in FIG. 5, defined by an I-shaped core 30 and a C-shaped core 31 on which a coil 38 are wound. The erase gap 36 is defined by an I-shaped core 32 and a C-shaped core 33 on which a coil 39 is wound. The coils 38 and 39 are connected to the flexible cables 23 shown in FIG. 3. The I-shaped cores 30 and 32 and the C-shaped cores 31 and 33 are connected to a back bar 37 and form magnetic circuits including the R/W gap 35 and the erase gap 36, respectively.

Disposed between the I-shaped cores 30 and 32 is a separator 40 which isolates the two magnetic circuits from each other.

The magnetic heads 10 and 11 hold the disk 13 therebetween at a location a radius $R_N$ away from the center of the disk 13 under a load of 10 to 25 gf·cm produced by the activity of the spring 8.

If the load of the spring 8 is defined as F, and the coefficient of friction (the coefficient of maximum friction or the coefficient of static friction) between each of the magnetic heads 10 and 11 and the disk 13 is defined as $\mu_S$, then the start torque $T_S$ required for rotating the disk 13 is $$T_S = 2 \times \mu_S \times F \times R_N$$

A maximum start torque of the spindle motor 12 is, thus, required when the magnetic heads 10 and 11 are located on an outermost peripheral portion (usually called track 0) of the disk 13.

In case of a 3.5-inch floppy disk, the maximum start torque is of the order of 100 to 120 gf·cm. Such being the case, the spindle motor 12 is usually a brushless direct drive motor designed to produce the torque in proportion to an input current.

When the floppy disk system is used in high temperature and humid conditions, it may cause, as described above, the disk 13 to be stuck to the magnetic heads 10 and 11, thus requiring the start torque of the spindle motor 12 that is more than 250 gf·cm.

The load at which the magnetic heads 10 and 11 hold the disk 13 therebetween is optimized in view of a vibration proofing characteristic of the floppy disk system and the compliance between each of the magnetic heads 10 and 11 and the disk 13. Therefore, decreasing the start torque of the spindle motor 12 requires decreasing the coefficient of friction $\mu_S$ between each of the magnetic heads 10 and 11 and the disk 13.

Figure 6:
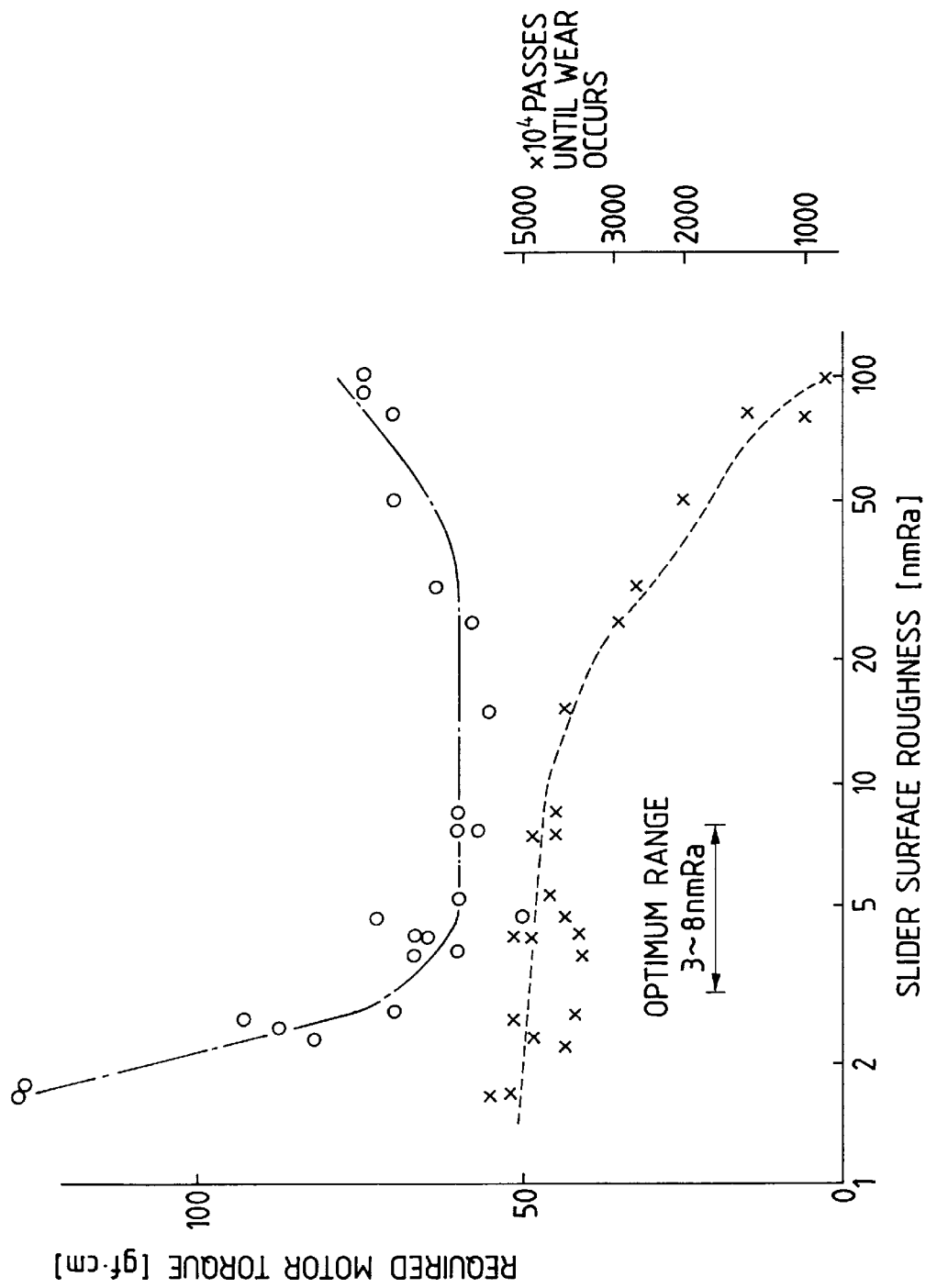
FIG. 6 is a graph which shows the initial required torque of a spindle motor, the surface roughness of a slider, and the total number of times one track passes magnetic heads until the wear of a magnetic disk occurs.

FIG. 6 shows the required start torque of the spindle motor 12, the surface roughness of the slider 21, and the total number of times one track passes the magnetic heads 10 and 11 (i.e., the total number of rotations of the disk 13) until the wear of the disk 13 occurs which will be referred to below as the number of wearcausing track passes.

A solid line indicates the relation between the required start torque and the surface roughness nmRa of the slider 21, i.e., the coefficient of friction $\mu_S$ when the magnetic heads 10 and 11 are located on the track 0 and shows that the required start torque gf·cm of the spindle motor 12 is low within a surface roughness range from 2.5 to 3.0 nmRa.

A broken line indicates the relation between the surface roughness of the slider 21 and the number of wear-causing track passes and shows that the number of wear-causing track passes is decreased greatly when the surface roughness of the slider 21 is more than 10 nmRa. The inventors of this application have found that substantially the same phenomenon occurs in a variety of magnetic disks.

The inventors of this applications have determined that the optimum surface roughness of the slider 21 is 3 to 8 nmRa taking a change thereof inevitably occurring in working processes into account.

The disk contact surfaces of the magnetic heads 10 and 11 are polished in the final stage of a working process. The magnetic core 22 and the slider 21 have the same or close Vickers hardnesses within a range of 600 to 800 Hv taking the ease of polishing and durability into account. These values have also been found to be best for the surface roughness and workability. The approximation of the hardness of the slider 21 to that of the magnetic core 22 avoids local wear thereof. The material of the slider 21 has, as described above, coefficient of thermal expansion close to that of the magnetic core 22, thereby eliminating the formation of steps on the magnetic core 22 and the slider 21.

In analysis of an abrasive powder (i.e., lapping powder) suitable for lapping the surface of the slider 21 to have a surface roughness of 3 to 8 nmRa taking the hardness, peripheral speed, and applied pressure of a lap of a lapping machine into account, the inventors of this application have been experimentally found that a chromic acid abrasive powder or a diamond powder having a grain size of approximately 2 to 8 μm is preferable.

It has also been found that the use of diamond powders which have grain sizes of 2 to 5 μmRa and 4 to 8 μmRa and which are blended at a weight ratio of 2:1 provides a surface roughness of approximately 3.0 to 3.5 nmRa to the slider 21 and that the use of a lapping liquid eliminates the generation of heat during lapping, resulting in no thermal stress acting on the magnetic core 22.

The spacing loss $L_S$ due to the clearance d between each of the magnetic heads 10 and 11 and the disk 13 is $$L_S(d/\lambda) = -20 \log e^{-2\pi d/\lambda} = 54.6 d/\lambda [dB]$$

where λ is the wavelength of a recording signal. A difference in spacing loss $L_S$ between surface roughness of 2 nmRa and 8 nmRa falls within a range of approximately 1% when the recording wavelength λ=3 μm.

Further, this embodiment allows a magnet of the spindle motor 12 to be changed from a neodymium iron to a ferrite-based material, resulting in a decrease in manufacturing cost.

While the present invention has been disclosed in terms of the preferred embodiment in order to facilitate a better understanding thereof, it should be appreciated that the invention can be embodied in various ways without departing from the principle of the invention. Therefore, the invention should be understood to include all possible embodiments and modification to the shown embodiments which can be embodied without departing from the princple of the invention as set forth in the appended claims.

What is claimed is:

1. A manufacturing process for a magnetic head of a floppy disk system comprising the steps of:

preparing a magnetic head including a slider and a magnetic core made of a soft magnetic material, the slider and the magnetic core having surfaces with which a magnetic disk contacts for recording and reproducing information signals on or from the magnetic disk; and lapping the surfaces of the slider and the magnetic core together to have a surface roughness of 3 to 8 $\mu$m.

2. A manufacturing process as set forth in claim 1, wherein the surfaces of the slider and the magnetic core together are lapped with one of a chromic acid abrasive powder and a diamond powder having a grain size of approximately 2 to 8 $\mu$m.

3. A manufacturing process as set forth in claim 1, wherein the slider and the magnetic core are made of materials having substantially the same hardness.

4. A manufacturing process as set forth in claim 3, wherein the materials of the slider and the magnetic core have a hardness within a range of 600 to 800 Hv.

\* \* \* \* \*

UNITED STATES PATENT AND TRADEMARK OFFICE
CERTIFICATE OF CORRECTION

PATENT NO.    : 6,031,689
DATED         : February 29, 2000
INVENTOR(S)   : Hiroshi Nishizawa et al.

Page 1 of 1

It is certified that error appears in the above-identified patent and that said Letters Patent is hereby corrected as shown below:

<u>Column 5,</u>
Line 12, please change "3 to 8µm" to -- 3 to 8nmRa --.

Signed and Sealed this

Twelfth Day of March, 2002

Attest:

Attesting Officer

JAMES E. ROGAN
*Director of the United States Patent and Trademark Office*